Sept. 19, 1967 E. O. SCHWEITZER 3,343,175
PRESSURE SCRIBING RECORDER
Filed Oct. 11, 1965
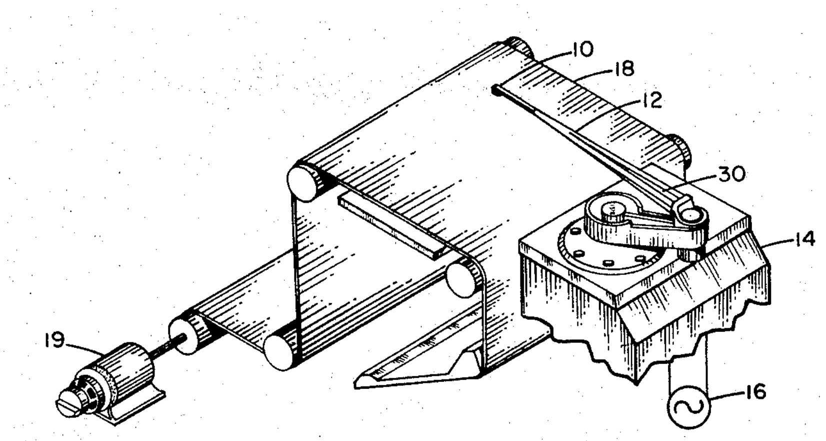
FIG. 1
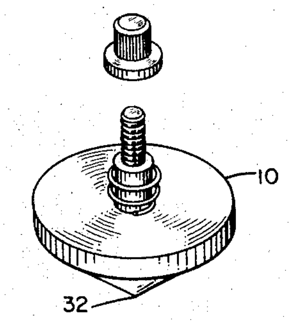
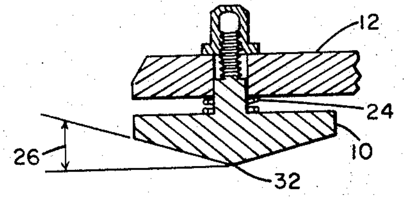
FIG. 3
FIG. 2
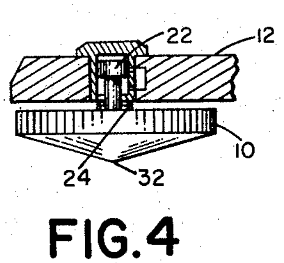
FIG. 4
INVENTOR.
EARL O. SCHWEITZER
BY Elber J. Hyde
ATTORNEY United States Patent Office 3,343,175

Patented Sept. 19, 1967

3,343,175

PRESSURE SCRIBING RECORDER

Earl O. Schweitzer, Wickliffe, Ohio, assignor to Clevite Corporation, a corporation of Ohio Filed Oct. 11, 1965, Ser. No. 494,699
5 Claims. (Cl. 346—77)

ABSTRACT OF THE DISCLOSURE

The present invention is directed to a stylus for writing on a pressure sensitive medium, wherein the stylus has an angle of advance of 15° plus or minus 3° so that it is highly effective to ride upon the surface of the record medium and exert very high unit pressures down on the medium, yet will not tear through or plow up the record medium.

This invention relates to a pressure scribing apparatus. More particularly, this invention relates to an extremely successful means of producing, by pressure, a legible line on a pressure sensitive chart medium without damaging the pressure sensitive material.

In the past, pressure sensitive mediums had to be extremely sensitive to lightly applied pressures in order to be used with equipment which was capable of operating only with very light, downward force on the stylus. Very light, downward stylus force had to be used because the prior art systems did not have adequate lateral force to drive the stylus across the record medium if high stylus biasing force was used. As a result, the record medium was vulnerable to extraneous pressure marks, as might result from the common, everyday handling of the chart medium.

Today, adequate stylus driving force is available which permits the use of greatly increased stylus biasing forces, which in turn allows the useage of less sensitive chart mediums. However, since there is more downward pressure on the stylus, there is a greater likelihood of the stylus damaging the chart medium. The applicant has avoided this likelihood by providing an improved pressure scribing apparatus, making it possible to consistently produce a fine, visible impression without stylus damage to the record medium and with greatly reduced danger of extraneous pressure marks occurring on the record chart.

Prior to Patent No. 3,088,788, it was quite difficult for the recorder drive motor to produce the required lateral forces to swing the stylus tip when sufficient biasing force to produce a fine, visible line was applied to the stylus tip in a vertical direction. Now, due to the aforesaid patent, such additional, vertical, oriented force can be applied to the stylus tip as is necessary to produce a consistently visible impression, and without damage to the record chart, because of the applicant's newly invented stylus shape. With the increased, available lateral forces, a much greater biasing force is possible and, in combination with the design characteristics of the present stylus, a fine, visible line is consistently produced without resulting in a damaged, scraped chart medium.

A satisfactory recording pressure apparatus has been discovered wherein a suitable impression, approximately two-thousandths of an inch wide, can be consistently made upon the recording medium.

A particular recording stylus shape has been further discovered that is critical for producing such a fine, consistent, visible impression upon the sensitive medium. Furthermore, when such stylus is combined with the aforesaid feedback pen motor, which has adequate power to drive the stylus across the record chart, a sufficient pressure biasing force can be applied to produce a consistent, fine, visible impression without damage to the record chart.

It has been further discovered that such factors as the stylus angle of advance, material, and the general surface finish of the stylus are important parameters in stylus design.

It is an object of this invention, therefore, to provide an improved pressure writing apparatus.

It is another object of this invention to provide pressure writing means for consistently producing an accurate and visible impression, even at high writing speeds.

It is still another object of this invention to provide a pressure writing stylus of proper geometric characteristics which will enable the production of a visible impression when combined with a satisfactory pressure effectuating means.

It is still another further object of this invention to eliminate the inadvertently applied extraneous marks which were often present with the employment of the prior art stylus and record chart.

In accordance with the invention, there is provided a pressure scribing apparatus for recording upon a pressure sensitive record medium which comprises such components as a stylus arm movable in respect to the record mediums to which there is attached a stylus having a highly polished tip of a conical configuration which has an angle of advance of 15° ±3°. Means are provided to secure the stylus to the stylus arm and suitable means are provided to effectively force the highly polished conical stylus tip against the record medium with a predetermined degree of force which is necessary to establish a visible imprint.

Preferably, in the specific embodiment of the invention, the stylus surface has a highly polished, maximum surface roughness of 2 RMS. The angle of advance of the stylus tip should be preferably limited to 15° ±3° and the stylus tip should be preferably made of a hard, abrasion-resistant material; for example: high carbon-steel, carbides, diamond, or sapphire. A securing means holds the stylus to the pen arm and may be comprised of at least one spring member and a suitable damping means. The stylus should be effectively forced against the record medium with a predetermined degree of force necessary to establish a visible imprint.

For a better understanding of the present invention, together with the other and further objects thereof, reference is had to the following description taken in connection with the accompanying drawings and its scope will be pointed out in the appended claims.

Referring now to the drawings:

FIGURE 1 is a schematic diagram showing the components of the pressure scribing system of the present invention;

FIGURE 2 is a perspective view of a writing member of a recording instrument, said writing member being particularly suitable for use in conjunction with the pressure scribing apparatus of the present invention;

FIGURE 3 is a cross-sectional view of the writing member (shown in FIGURE 2) of a recording instrument, depicting the angle of advance;

FIGURE 4 is a partial, sectional view of a writing member of a recording instrument shown with suitable means, such as a spring, to maintain the stylus tip on the recording medium, despite surface irregularities thereon, together with a suitable damping means to minimize any vibrations or oscillations induced by such spring means, said writing member being particularly suitable for use in conjunction with the pressure scribing apparatus of the present invention.

Referring now, more particularly, to FIGURE 1 which schematically shows the environment of the present invention and includes a pen motor 14 which receives its electrical signal from source 16 and which in turn actuates the stylus arm 12 to which the stylus tip 10, the particular subject matter of the present invention, is attached. The record chart medium 18 is driven past the stylus tip 10 by a motor 19, resulting in a visible impression on the record chart medium 18. FIGURES 3 and 4 show a stylus arm 12 and a highly polished stylus tip 10 of conical shape affixed thereto. The actual point 32 can be extremely sharp. The angle of advance 26 shown in the FIGURE 3 should preferably fall within a range of 15°±3°. The principle of the invention is such that the stylus rides up on top of the record chart medium 18. This produces sufficiently high, localized pressure at the sharpened stylus point 10 when it is subjected to the pressure biasing means 30 attached to the stylus arm 12. The biasing force is in a vertical, oriented direction with respect to the sensitive recording layer. With the high, downward biasing forces on the stylus, relative movement between the record chart medium and the prior art stylus would cause the sharp stylus to sever the record medium, much as the prow of a ship cuts through water. However, with the unique, low-angle stylus of this invention, relative motion between the stylus and the record chart medium causes the stylus to ride high on the surface of the paper, somewhat like an icebreaker ship riding up on an ice layer and crushing the ice downwardly. By utilizing such a low angle of advance, the action of the stylus tip is downward in a vertical direction rather than in a more horizontal plane as the record chart medium moves in relation to the stylus. By the stylus pushing forward rather than downward, as the aforementioned, prior art stylus and record chart medium move in relation to one another, the record chart medium is scraped off, hence causing irreparable damage and providing no solution to the recording problem. Furthermore, the tip should be of a hard, abrasion-resistant, smooth material to help facilitate this function. Satisfactory materials have been found to be high carbon-steel, carbides, diamond, or sapphire.

FIGURE 3 shows a suitable means for both securing and maintaining the highly polished stylus tip 10 on the irregular record medium surface 18 at even high rates of speed. The depicted structure is comprised of a spring 24 coupled with a dash pot 22 or damping means 22, for facilitating the maintenance of pressure at the stylus tip, while still permitting any oscillations due to the surface irregularities of the record medium 18 to be minimized by the damping action of the dash pot means 22.

It is felt that the invention should, by no means, be confined to the depicted example of the spring means 24 and dash pot means 22 since any number of equivalents, e.g., lubricating oil in conjunction with O-rings, duplicates sets of springs alone or in conjunction with lubricating oil, several spring members coated with oscillation vibration absorbing materials, etc., would prove comparatively satisfactory.

In the actual operation of the invention, a sharp line of approximately two-thousandths of an inch wide is produced. With the presently available feedback pen motor, Patent No. 3,088,788, it is possible to significantly increase the pen biasing force such that a visible imprint is produced by the present invention. The increased, available biasing pressure is made possible by the additional force provided by the feedback pen motor in a lateral direction necessary to overcome the frictional forces resulting from such increased biasing force. In addition, the action of the present stylus tip insures that the sensitive layer is not removed or scraped from the base material of the record medium, if the geometry of the claimed invention is practiced.

At high writing speeds, it is even possible for significant, frictional heat to develop at the stylus tip. It has been found that at 50 cycles per second, in conjunction with a 15 gram side force to drive the pen, approximately 1.5 watts of frictional energy are produced at the point of contact between the stylus tip 10 and the record medium 18. This heat tends to augment the pressure and, together, they produce a more satisfactory result than with pressure alone. However, the pressure feature of this invention is certainly satisfactory for present commercial purposes.

The present invention has been found to be satisfactory on practically all types of record mediums. These include pressure-only mediums, pressure-heat-sentitive mediums, and even heat-sensitive-only mediums with certain characteristics. With any of these mediums, it is still necessary to have sufficient pressure at the stylus tip to produce a satisfactory, visible impression. This effective pressure is dependent on the record medium characteristics and the stylus geometry. A satisfactory, downward-acting pressure is the result of the summation of the pressure biasing force, partial stylus arm weight, and stylus weight itself. For example, we have found a pressure of 15,000 p.s.i. over the cross-sectional contact area to be adequate to produce a fine, visible impression without damage to the record chart.

While there have been described what are at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

I claim:

1. A pressure scribing apparatus for recording upon a pressure sensitive record medium, which comprises: a stylus arm movable in respect to the record medium; a highly polished stylus tip of conical shape having an angle of advance of 15°±3°; means to secure said stylus tip to said stylus arm; and means to effectively force said stylus tip against the record medium with a predetermined degree of force necessary to establish a visible imprint.

2. A pressure scribing apparatus according to claim 1 whereby the stylus tip is made of a hard, abrasion-resistant material.

3. A pressure scribing apparatus as recited in claim 1 in which the securing means comprises at least one spring member and a suitable damping means.

4. A pressure scribing apparatus according to claim 1 whereby the surface roughness of the highly polished stylus tip is a maximum of 2 RMS.

5. A pressure scribing apparatus for recording upon a pressure sensitive record medium, which comprises: a stylus arm movable in respect to the record medium; a stylus tip polished to have a maximum surface roughness of 2 RMS and of conical shape, said tip being comprised of a hard, abrasion-resistant material and having an angle of advance of 15°±3°; securing means comprised of at least one spring member and a suitable damping means; and means to effectively force said stylus tip against the record medium with a predetermined degree of force necessary to establish a visible imprint.

References Cited

UNITED STATES PATENTS

| | | | |
|---|---|---|---|
| 3,016,612 | 1/1962 | Lynott | 346—139 X |
| 3,035,267 | 5/1962 | Vogtlin | 346—77 |
| 3,054,109 | 9/1962 | Brown | 346—117 |
| 3,088,788 | 5/1963 | Brown et al. | 346—139 |
| 3,187,332 | 6/1965 | Barter et al. | 346—139 |
| 3,230,625 | 1/1966 | Meyer | 33—32 |

RICHARD B. WILKINSON, *Primary Examiner.*

J. W. HARTARY, *Assistant Examiner.*